US011853121B2

(12) United States Patent
Lim et al.

(10) Patent No.: US 11,853,121 B2
(45) Date of Patent: Dec. 26, 2023

(54) BACK INPUT/OUTPUT INTERFACE DESIGN

(71) Applicant: ZEBRA TECHNOLOGIES CORPORATION, Lincolnshire, IL (US)

(72) Inventors: Sunghun Lim, Bethpage, NY (US); Dae Suk Noh, Vernon Hills, IL (US); Kuen-Ying Lin, Taipei (TW)

(73) Assignee: Zebra Technologies Corporation, Lincolnshire, IL (US)

( * ) Notice: Subject to any disclaimer, the term of this patent is extended or adjusted under 35 U.S.C. 154(b) by 9 days.

(21) Appl. No.: 16/886,401

(22) Filed: May 28, 2020

(65) Prior Publication Data

US 2021/0373599 A1 Dec. 2, 2021

(51) Int. Cl.
*G06F 1/16* (2006.01)
*H01R 27/00* (2006.01)

(52) U.S. Cl.
CPC .......... *G06F 1/1632* (2013.01); *G06F 1/1656* (2013.01); *H01R 27/00* (2013.01); *H01R 2201/06* (2013.01); *H01R 2201/16* (2013.01)

(58) Field of Classification Search
CPC .... G06F 1/1632; G06F 1/1633; G06F 1/1656; G06F 1/1684
See application file for complete search history.

(56) References Cited

U.S. PATENT DOCUMENTS

| | | | | |
|---|---|---|---|---|
| 10,038,288 | B2 * | 7/2018 | Choi | H01R 13/22 |
| 11,184,981 | B2 * | 11/2021 | Williams | H05K 3/0026 |
| 2012/0319487 | A1 | 12/2012 | Shah | |
| 2016/0309010 | A1 | 10/2016 | Carnevali | |
| 2017/0068276 | A1 * | 3/2017 | Wagman | G06F 3/0202 |
| 2017/0134063 | A1 * | 5/2017 | Lee | H04B 1/3877 |
| 2018/0013221 | A1 * | 1/2018 | Castell | H02J 7/025 |
| 2018/0074550 | A1 | 3/2018 | Sorias et al. | |
| 2019/0121445 | A1 * | 4/2019 | Wang | H04M 1/0254 |
| 2019/0208043 | A1 | 7/2019 | Cha et al. | |
| 2020/0274573 | A1 | 8/2020 | Marcum | |
| 2020/0382151 | A1 | 12/2020 | Pine | |

OTHER PUBLICATIONS

International Search Report and Written Opinion for International Application No. PCT/US2021/33666 dated Sep. 9, 2021.
Novelty Search Report for Belgian Patent Application No. 2021/5388 dated Jan. 21, 2022.

* cited by examiner

*Primary Examiner* — Anthony Q Edwards

(57) ABSTRACT

A connector assembly for a mobile device is provided that includes a back plate adapted to be operably coupled with a mobile device, a connector region operably couple with the back plate, and at least one alignment member operably coupled with the back plate and positioned adjacent to the connector region. The connector region is configurable in at least a first arrangement and a second arrangement. The at least one alignment member aligns with the connector region and frictionally receive an accessory device. In the first arrangement, the connector region includes at least one electrical connector, and in the second arrangement, the connector region includes no electrical connectors.

17 Claims, 5 Drawing Sheets

BACK INPUT/OUTPUT INTERFACE DESIGN

BACKGROUND OF THE INVENTION

A number of devices may be used in warehouse and similar settings to assist with locating, retrieving, and/or scanning items. For example, mobile computing devices may be used to obtain items and relevant information. It is oftentimes desirable to employ mobile computers that can accept a number of various accessories, and as a result, such mobile computers oftentimes require several varying hardware interfaces that communicate with the various accessories. Such different hardware interfaces oftentimes occupy both internal and external space of the mobile computing device, and can be cumbersome to switch between interfaces to use desired accessories. Further, the process of switching the interface to accommodate different accessory devices may be time consuming and lead to operational inefficiencies.

Accordingly, there is a need for improved accessories having improved functionalities.

SUMMARY

According to a first aspect, a connector assembly for a mobile device is provided that includes a back plate adapted to be operably coupled with a mobile device, a connector region operably couple with the back plate, and at least one alignment member operably coupled with the back plate and positioned adjacent to the connector region. The connector region is configurable in at least a first arrangement and a second arrangement. The at least one alignment member aligns with the connector region and frictionally receive an accessory device. In the first arrangement, the connector region includes at least one electrical connector, and in the second arrangement, the connector region includes no electrical connectors. In some examples, the at least one electrical connector is in the form of a pogo pin.

In some examples, in the first arrangement, the connector region includes two pogo pins. In other examples, in the first arrangement, the connector region may include four pogo pins. Further, in some examples, in the first arrangement, the connector region may include eight pogo pins.

In some of these examples, the at least one electrical connector is flush mounted with the back plate. Further, in some examples, the at least one electrical connector includes a surface-mount technology (SMT) connector operably coupled with a flex board assembly.

In some approaches, the connector region is removably coupled with the back plate. In some examples, the at least one alignment member includes a recess formed in the back plate. The at least one alignment member may include an uninterrupted sidewall surface. In other approaches, two alignment members may be disposed on opposite ends of the connector region.

In some examples, the accessory device includes one of a charging cradle, a payment module, a trigger handle, a dimensioning module, or a heads-up display.

According to a second aspect, an assembly for a mobile device includes a first removable back plate adapted to be operably coupled with a mobile device and a second removable back plate adapted to be operably coupled with the mobile device. The first removable back plate includes a first connector region having a first number of electrical connectors and at least one first alignment member positioned adjacent to the first connector region. the second removable back plate includes a second connector region having a second number of electrical connectors that is different than the first number of electrical connectors and at least one second alignment member positioned adjacent to the second connector region.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
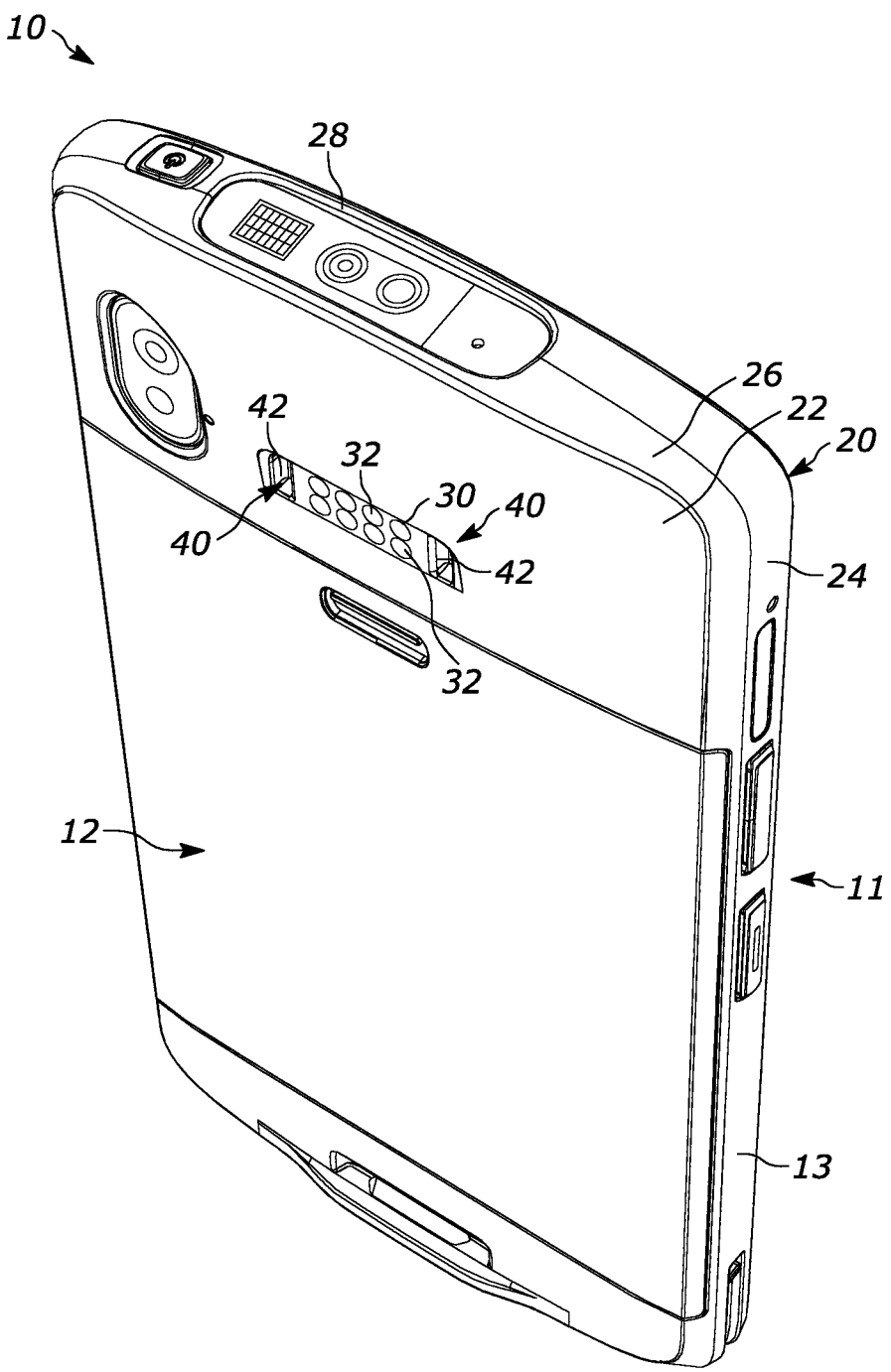
FIG. 1 is a rear perspective view of an example mobile device having an example connector assembly coupled thereto in accordance with this disclosure.
Figure 2:
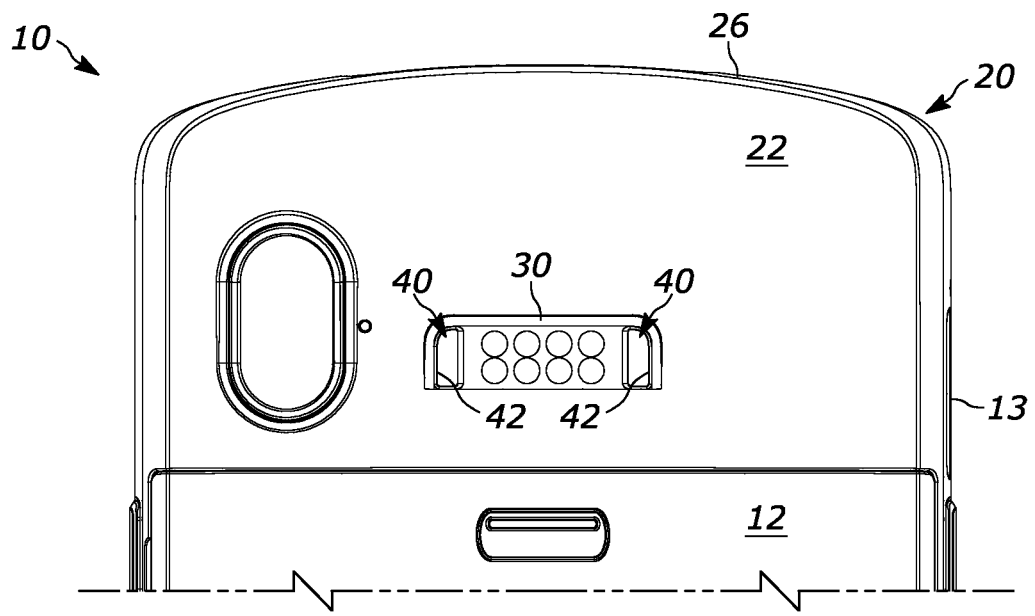
FIG. 2 is a rear plan view of the example connector assembly for use with the example mobile device of FIG. 1 in accordance with this disclosure.
Figure 3:
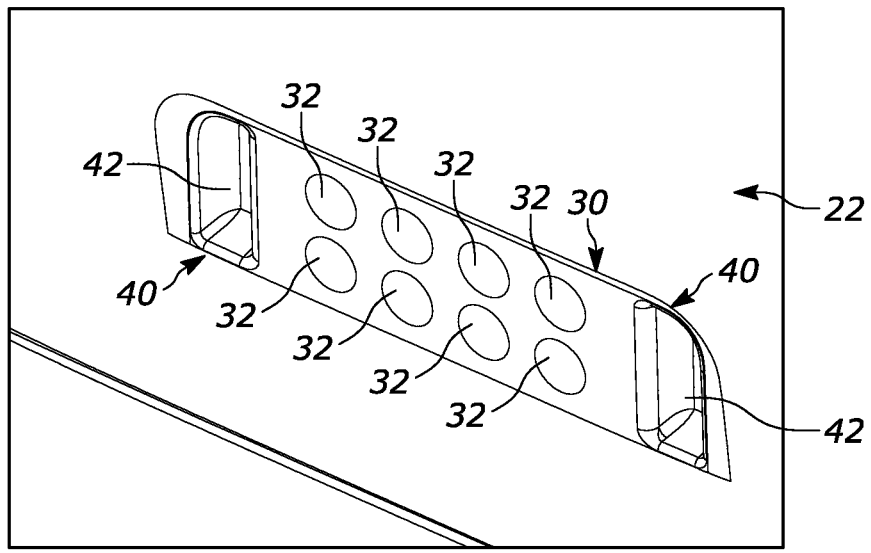
FIG. 3 is a close-up rear perspective view of the example connector assembly of FIGS. 1 and 2 in accordance with this disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Turning to the figures, reference numeral 10 generally identifies an example mobile device capable of performing a number of functions such as, for example, scanning items including barcodes or labels, capturing images, receiving and/or processing electronic payments, obtaining measurements, and any number of additional functions. The device 10 may be provided in a number of varying form factors, models, arrangements, or SKUs depending on the desired application and/or use, but may still retain the same overall shape and size across these different arrangements.

Further, the device 10 may be modified to be used in varying environments where any number of accessory devices may be implemented. As a non-limiting example, the accessory device or devices may be any number of a charging cradle, a payment module, a trigger handle, a dimensioning module, and/or a heads-up display. Other examples are possible. These different accessory devices may have different electrical requirements for transmitting signals, data and/or power, and as such, to accommodate the use of the device 10 with varying accessory devices, the device 10 includes a first connector assembly 20 operably and removably coupled with the mobile device 10. The first connector assembly 20 (and additional connector assemblies described below) may be coupled with the desired mobile device 10 model or arrangement as needed.

The connector assembly 20 includes a first back plate 22 in the form of a body operably coupled with the mobile device 10, a connector region 30 operably coupled with the back plate 22, and any number of alignment members 40 operably coupled with the back plate 22. Briefly, the mobile device 10 includes a front end 11, a back end 12, and a sidewall 13 extending between the front and back ends 11, 12. In some examples, the back plate 22 is dimensioned to frictionally engage the mobile device 10 (e.g., via a snap-fit connection). More specifically, the back plate 22 may include outer ends 24 and an upper end 26 dimensioned to be placed over and frictionally engage the sidewall 13 of the mobile device 10. Other examples of suitable coupling mechanisms are possible.

As previously noted, the connector region 30 is operably coupled with the back plate 22. In some examples, the connector region 30 is flush-mounted with an outer surface of the back plate 22, and as such, the connector region 30 does not protrude outwardly therefrom. The connector region 30 is configurable in any number of different arrangements where any number of electrical connectors 32 may be implemented thereon. Generally, the connector region 30 is arranged to provide an electrical coupling between a desired accessory device and the mobile device 10. In the illustrated example of FIGS. 1-4, the connector region 30 includes eight electrical connectors 32. However, in other examples, the connector region 30 may include no electrical connectors (FIG. 6), two electrical connectors (FIG. 5), four electrical connectors (not illustrated), or any other number of electrical connectors 32 as desired.

Figure 4:
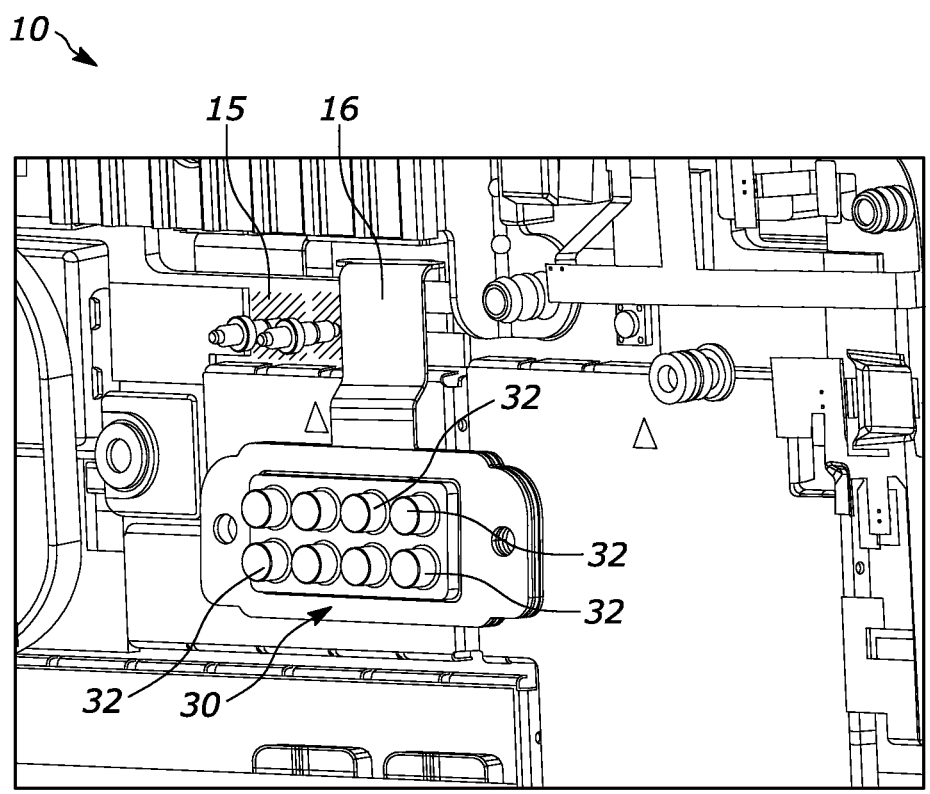
FIG. 4 is a rear perspective view of the example connector assembly of FIG. 3 being coupled with an example circuit board of the example mobile device in accordance with this disclosure.

In some examples, and as illustrated in FIG. 4 which depicts the mobile device 10 with the back plate 22 removed therefrom, the electrical connectors 32 may be in the form of pogo pins that are coupled with a circuit board 15 of the mobile device 10 via a surface-mount technology (SMT) whereby a flex board 16 electrically connects the circuit board 15 with the electrical connectors 32. However, other examples of suitable electrical connectors 32 are possible.

Depending on the number of electrical connectors 32 needed to electrically connect the desired accessory device with the mobile device 10, the electrical connectors 32 may be selectively removed from or coupled with the connector region 30. These electrical connectors 32 may be coupled with the connector region 30 via a frictional connection, a snap-fit connection, a fastener or fasteners, and the like. Other examples of coupling mechanisms are possible. In some examples, a cover may be provided to cover or block off areas of the connector region 30 that are not occupied by an electrical connector 32. As will be discussed with reference to FIGS. 5 and 6, in some approaches, different connector assemblies may be implemented having connector regions 30 with varying numbers of electrical connectors.

As previously noted, the connector assembly 20 further includes at least one alignment member 40 operably coupled with the back plate 22. In the illustrated example, two alignment members 40 are provided that are positioned adjacent to the connector region 30 on opposite ends thereof, but in other examples, any number of alignment members 40 may be provided on the back plate 22. Generally, the alignment members 40 are provided to align electrical connectors disposed on the accessory device with the electrical connectors 32 of the connector region 30. In the illustrated examples, the alignment members 40 are in the form of recesses 42 extending inwardly into the back plate 22 having a generally conical or semi-conical shape. Other examples are possible. Notably, the alignment members 40 do not include an undercut region to further retain the accessory device. Rather, the recess 42 includes a sidewall surface that is uninterrupted such that it is shaped to receive a corresponding protrusion formed on the accessory device and form a friction fit therewith while permitting relative axial movement therebetween. In other words, the recess 42 is free of additional depressions, notches, and/or catches. However, the conical or semi-conical sidewalls of the recess 42 are arranged to prevent relative, non-axial movement between the connector assembly 20 (and thus, the mobile device 10) and the accessory device.

In some examples, the upper end 26 of the back plate 22 includes an opening 28 formed thereon to accommodate and/or provide an opening for a built-in recording system and/or an imaging system 16 which, in some examples, may include a scan engine coupled with the mobile device 10.

Figure 5:
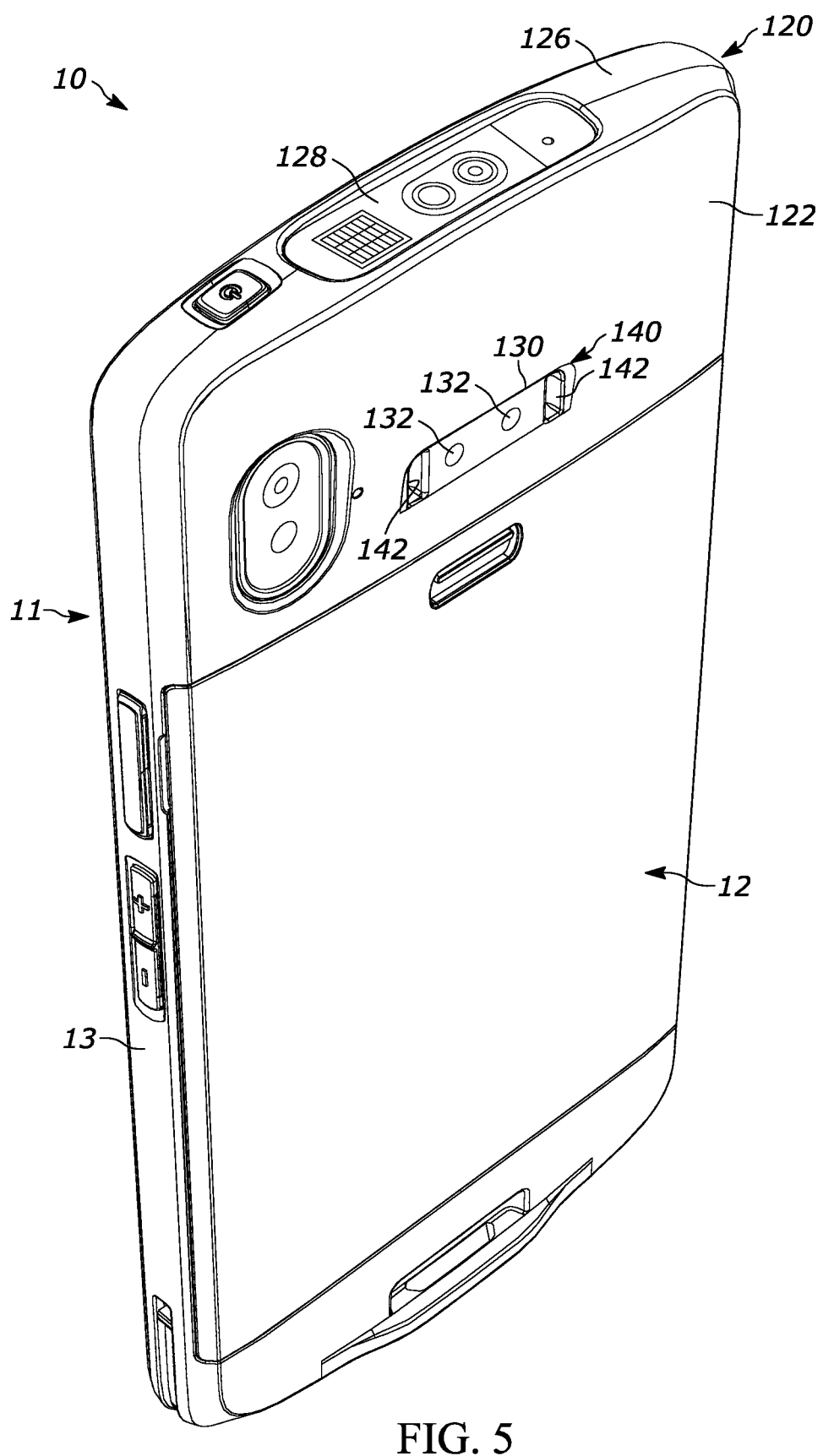
FIG. 5 is a rear perspective view of a second example connector assembly for use with the example mobile device in accordance with this disclosure.

The connector assembly 20 may include any number of additional components and/or implementations such as, for example, the use of additional removable back plates having connector regions that include varying number of electrical connectors. For example, FIG. 5 illustrates a second removable back plate 122 having similar features as the first removable back plate 22. Accordingly, these similar features will not be described in substantial detail. However, in this example, the second removable back plate 122 includes a second connector region 130 having a different number of electrical connectors 132 than the first connector region 30. More specifically, the second removable back plate 122 includes a connector region 130 having two electrical connectors 132 coupled therewith. Accordingly, in this example, instead of selectively removing electrical connectors from the connector region as needed to accommodate different accessory devices, a user may simply replace the first back plate 22 with the second back plate 122 to accommodate a different accessory device. In these examples, the alignment members 140 are positioned in a similar arrangement as the alignment members 40, though other implementations and arrangements are possible.

Figure 6:
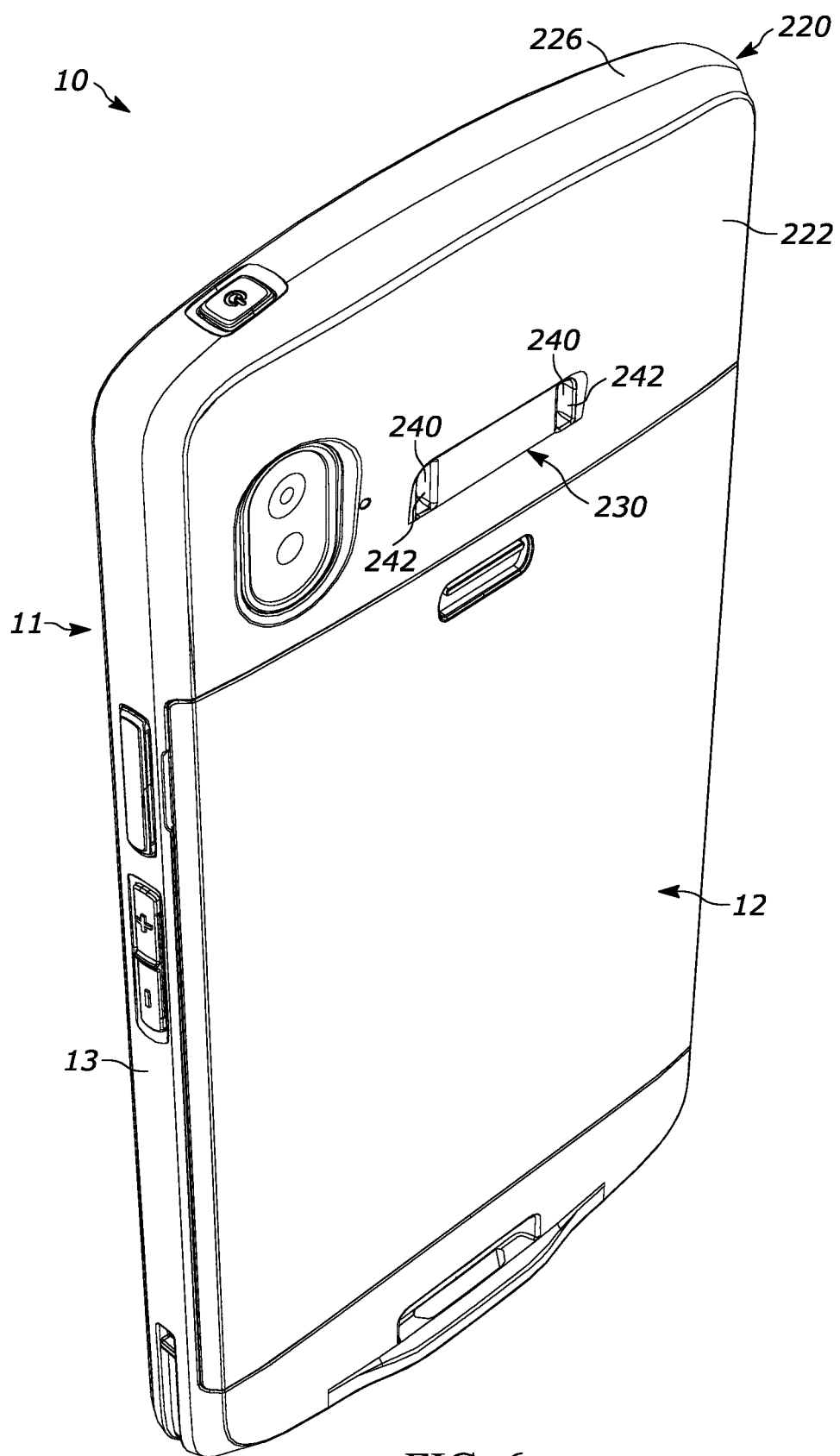
FIG. 6 is a rear perspective view of a third example connector assembly for use with the example mobile device in accordance with this disclosure.

With reference to FIG. 6, a second alternative removable back plate 222 having similar features as the first and second removable back plates 22, 122. Accordingly, such similar features will not be described in substantial detail. However, in this example, the third removable back plate 222 includes a third connector region 230 having no electrical connectors. In some implementations, accessory devices may not need to be electrically coupled with the mobile device 10, and as such, electrical connectors are not needed. Accordingly, the back plate 222 simply includes alignment members 240 to receive the accessory device to couple the accessory device with the mobile device 10. In this example, the upper end 226 of the back plate 222 does not include an opening to accommodate an imaging system or other components of the mobile device 10.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A connector assembly for a mobile device, the connector assembly comprising:
   a back plate adapted to be operably coupled with a mobile device, the back plate capable of installing flat on a back side of the mobile device;
   a connector region being operably coupled with the back plate, the connector region being configurable in at least a first arrangement and a second arrangement; and
   at least one alignment member being operably coupled with the back plate and positioned adjacent to the connector region, the at least one alignment member adapted to align with the connector region and to frictionally receive an accessory device;
   wherein in the first arrangement, the connector region includes at least one electrical connector, and in the second arrangement, the connector region includes no electrical connectors.

2. The connector assembly of claim 1, wherein the at least one electrical connector comprises a pogo pin.

3. The connector assembly of claim 1, wherein in the first arrangement, the connector region includes two pogo pins.

4. The connector assembly of claim 1, wherein in the first arrangement, the connector region includes four pogo pins.

5. The connector assembly of claim 1, wherein in the first arrangement, the connector region includes eight pogo pins.

6. The connector assembly of claim 1, wherein the at least one electrical connector is flush mounted with the back plate.

7. The connector assembly of claim 1, wherein the at least one electrical connector includes a SMT connector operably coupled with a flex board assembly.

8. The connector assembly of claim 1, wherein the connector region is removably coupled with the back plate.

9. The connector assembly of claim 1, wherein the at least one alignment member includes a recess formed in the back plate.

10. The connector assembly of claim 9, wherein the at least one alignment member includes an uninterrupted sidewall surface.

11. The connector assembly of claim 10, further comprising two alignment members being disposed on opposite ends of the connector region.

12. An assembly for a mobile device, the assembly including:
   a first removable back plate adapted to be operably coupled with a mobile device, the first removable back plate including:
      a first connector region having a first number of electrical connectors, and
      at least one first alignment member positioned adjacent to the first connector region;
   a second removable back plate adapted to be operably coupled with the mobile device, the second removable back plate including:
      a second connector region having a second number of electrical connectors different than the first number of electrical connectors, and
      at least one second alignment member positioned adjacent to the second connector region.

13. The assembly of claim 12, wherein the first connector region and the second connector region include at least one pogo pin connector.

14. The assembly of claim 12, wherein the first connector region is flush mounted with the first removable back plate.

15. The assembly of claim 12, wherein the first connector region includes a SMT connector operably coupled with a flex board assembly.

16. The assembly of claim 12, wherein the at least one first alignment member includes a recess formed in the first removable back plate.

17. The assembly of claim 16, wherein the at least one first alignment member does not include an undercut region.

* * * * *